(12) United States Patent
Ma et al.

(10) Patent No.: US 10,718,893 B2
(45) Date of Patent: Jul. 21, 2020

(54) LIGHT GUIDE PLATE (LGP) POSITIONING STRUCTURE, BACKLIGHT MODULE AND DISPLAY DEVICE

(71) Applicant: BOE TECHNOLOGY GROUP CO., LTD., Beijing (CN)

(72) Inventors: Yongda Ma, Beijing (CN); Jianbo Xian, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 142 days.

(21) Appl. No.: 15/757,106

(22) PCT Filed: Aug. 31, 2017

(86) PCT No.: PCT/CN2017/099970
§ 371 (c)(1),
(2) Date: Mar. 2, 2018

(87) PCT Pub. No.: WO2018/145449
PCT Pub. Date: Aug. 16, 2018

(65) Prior Publication Data
US 2019/0079241 A1    Mar. 14, 2019

(51) Int. Cl.
*F21V 8/00* (2006.01)
*G09G 3/22* (2006.01)

(52) U.S. Cl.
CPC ......... *G02B 6/0086* (2013.01); *G02B 6/0036* (2013.01); *G02B 6/0088* (2013.01); *G09G 3/22* (2013.01)

(58) Field of Classification Search
CPC .. G02B 6/0086; G02B 6/0036; G02B 6/0088; G09G 3/22; F21V 7/00; F21V 7/0025; F21V 7/22
USPC .................................................. 362/600–634
See application file for complete search history.

(56) References Cited

U.S. PATENT DOCUMENTS

| 2007/0086213 A1 | 4/2007 | Hsieh |
| 2012/0044714 A1 | 2/2012 | Lee et al. |
| 2014/0192292 A1* | 7/2014 | Li ........................ G02B 6/0088 349/65 |

(Continued)

FOREIGN PATENT DOCUMENTS

| CN | 1952753 A | 4/2007 |
| CN | 202361183 U | 8/2012 |

(Continued)

OTHER PUBLICATIONS

International Search Report and Written Opinion dated Dec. 4, 2017; PCT/CN2017/099970.

(Continued)

*Primary Examiner* — Cara E Rakowski
*Assistant Examiner* — Jessica M Apenteng

(57) ABSTRACT

A light guide plate (LGP) positioning structure, a backlight module and a display device are provided. The LGP positioning structure includes: a plurality of positioning members disposed between a first surface of a LGP and a back plate. The first surface is adjacent to an incident surface of the LGP. The surface reflectivity of the positioning members near the incident surface is lower than the surface reflectivity of the positioning members away from the incident surface.

18 Claims, 2 Drawing Sheets

(56) References Cited

U.S. PATENT DOCUMENTS

2016/0154172 A1    6/2016  Komano et al.

FOREIGN PATENT DOCUMENTS

| | | |
|---|---|---|
| CN | 102943980 A | 2/2013 |
| CN | 202769470 U | 3/2013 |
| CN | 203311025 U | 11/2013 |
| CN | 204153707 U | 2/2015 |
| CN | 206421060 U | 8/2017 |
| KR | 1020130019231 A | 2/2013 |
| KR | 1020130131738 A | 12/2013 |

OTHER PUBLICATIONS

Australian Notice of Acceptance dated Aug. 29, 2019; Appln. No. 2017398581.
Korean Office Action dated Sep. 19, 2019; Appln. No. 10-2018-7026602.
Second Korean Office Action dated Mar. 26, 2020; Appln. No. 10-2018-7026602.

\* cited by examiner

LIGHT GUIDE PLATE (LGP) POSITIONING STRUCTURE, BACKLIGHT MODULE AND DISPLAY DEVICE

CROSS REFERENCE TO RELATED APPLICATIONS

The application claims priority to the Chinese patent application No. 201720119584.3, filed Feb. 9, 2017 with SIPO and entitled "Light Guide Plate Positioning Structure, Backlight Module and Display Device", which is incorporated herein by reference in its entirety.

TECHNICAL FIELD

Embodiments of the present disclosure relate to a light guide plate (LGP) positioning structure, a backlight module and a display device.

BACKGROUND

Abrupt change of optical cross-section easily occurs on the periphery of a light guide plate (LGP) positioning structure of a backlight, then, an abrupt change of optical effect occurs, so that a shadow is generated at a point far away from a light source, and a bright area is generated at a position near the light source. Currently, to solve the problem, a common way is to arrange a reflector plate on the periphery of the LGP positioning structure to balance the bright and dark shadows caused by abrupt change of edge. However, the reflector plate is easy to fall off and is difficult to adjust the shadow problem.

SUMMARY

Embodiments of the present disclosure provide a light guide plate (LGP) positioning structure, a backlight module and a display device.

According to embodiments of the present disclosure, a light guide plate (LGP) positioning structure is provided, comprising: a plurality of positioning members arranged between a first surface of a LGP and a back plate, wherein the first surface is adjacent to an incident surface of the LGP, and a surface reflectivity of the positioning members near the incident surface is lower than a surface reflectivity of the positioning members away from the incident surface.

In an example, the surface reflectivity of the plurality of positioning members is gradually increased along a first direction, the first direction being a direction extended from a first end of the first surface adjacent to the incident surface to a second end opposite to the first end.

In an example, the color of the plurality of positioning members is gradually changed from darker to lighter along a first direction, the first direction being a direction extended from a first end of the first surface adjacent to the incident surface to a second end opposite to the first end.

In an example, protrusions or recessions are arranged on a surface of the positioning members contacting the first surface of the LOP.

In an example, when the protrusions are arranged on the surface of the positioning members contacting the first surface of the LGP, a number of the protrusions on the positioning members near the incident surface is less than a number of the protrusions on the positioning members away from the incident surface.

In an example, the number of the protrusions on the plurality of positioning members is gradually increased along a first direction, the first direction being a direction parallel to a direction from a first end of the first surface adjacent to the incident surface to a second end opposite to the first end.

In an example, when the recessions are arranged on the surface of the positioning members contacting the first surface of the LGP, a number of the recessions on the positioning members near the incident surface is greater than a number of the recessions on the positioning members away from the incident surface.

In an example, the number of the recessions on the plurality of positioning members is gradually decreased along a first direction, the first direction being a direction parallel to a direction from a first end of the first surface adjacent to the incident surface to a second end opposite to the first end.

In an example, positioning grooves are arranged on the first surface, the positioning members being received in the positioning grooves.

According to embodiments of the present disclosure, a backlight module is provided, comprising the light guide plate positioning structure.

According to embodiments of the present disclosure, a display device is provided, comprising the backlight module.

BRIEF DESCRIPTION OF THE DRAWINGS

Embodiments of the present disclosure will be described in more detail below with reference to accompanying drawings to allow an ordinary skill in the art to more clearly understand embodiments of the present disclosure, in which.

DETAILED DESCRIPTION

Technical solutions of the embodiments will be described in a clearly and fully understandable way in connection with the drawings related to the embodiments of the disclosure. It is apparent that the described embodiments are just a part but not all of the embodiments of the disclosure. Based on the described embodiments herein, those skilled in the art can obtain other embodiment(s), without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," "left," "right," or the like are only used to indicate relative position relationship, and when the position of the object which is described is changed, the relative position relationship may be changed accordingly.

Figure 1:
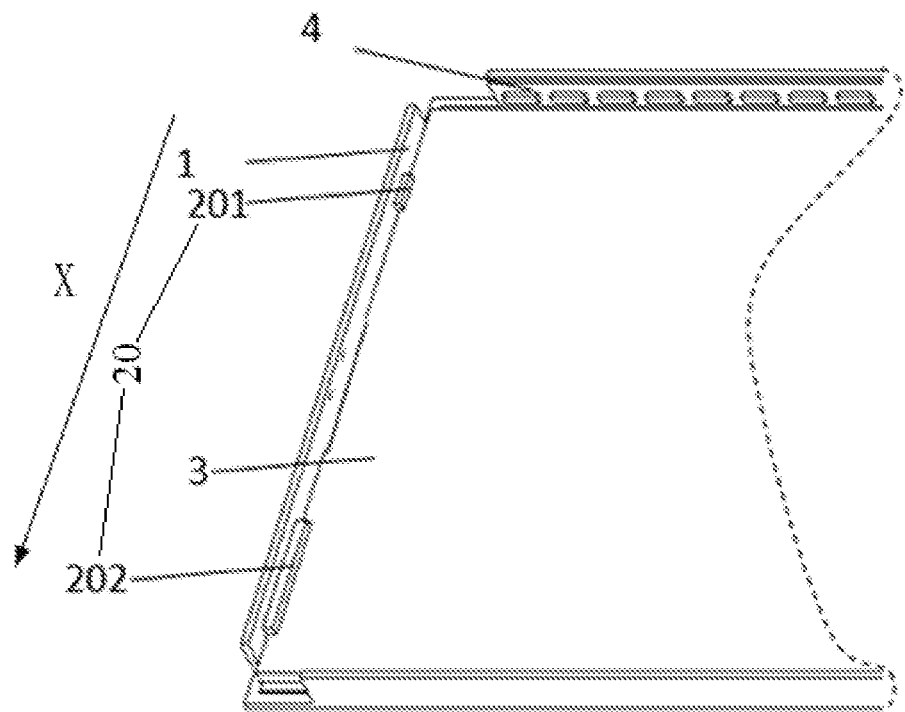
FIG. 1 is a schematic structural view of a LGP positioning structure in an embodiment of the present disclosure.

As shown in FIG. 1, an embodiment provides a light guide plate (LGP) positioning structure, which comprises a plurality of positioning members 20 disposed between a first surface of a LGP 3 and a back plate 1. A first surface of the LGP 3 is adjacent to an incident surface of the LGP 3. The color of the positioning members near the incident surface is darker than the color of the positioning members away from the incident surface.

Abrupt change of optical effect easily occurs on the periphery of the LGP positioning structure, so that a shadow is generated at a point away from a light source 4, and a bright area is generated at a position near the light source 4. For instance, for an edge-lit backlight, a shadow can be easily generated at a point away from the incident surface of the LGP 3, and a bright area can be easily generated at a point near the incident surface of the LGP 3. The embodiments of the present disclosure solve the problem through the positioning members at different positions and different color shades. For instance, the color of the positioning members disposed at the bright areas is dark, and the color of the positioning members disposed at positions where the shadows are generated is light.

In the embodiment, it includes two positioning members 20. As shown in FIG. 1, the positioning member near the incident surface is a first positioning member 201, and the positioning member away from the incident surface is a second positioning member 202. But the embodiment of the present disclosure is not limited thereto. For instance, three, four or more positioning members may be arranged.

In the embodiment, as shown in FIG. 1, the color of the first positioning member 201 near the incident surface is black, and the color of the second positioning member 202 away from the incident surface is white. That is to say, the surface reflectivity of the first positioning member 201 near the incident surface is lower than the surface reflectivity of the second positioning member 202 away from the incident surface.

For instance, the first positioning member is made from black rubber, the surface reflectivity of which is less than or equal to about 30% and greater than or equal to about 5%; and the second positioning member is made from white rubber, the surface reflectivity of which is less than or equal to about 98% and greater than or equal to about 45%. The ratio of the reflectivity of the positioning members arranged from an incident end to a far-reaching position is directly proportional to the ratio of the distance from the positioning members to the light source. But the embodiment of the present disclosure is not limited thereto. For instance, in a case of a plurality of positioning members arranged, the color of the positioning members may be gradually lighter from a proximal end near the incident surface to a distal end away from the incident surface. That is to say, the surface reflectivity of the positioning members is gradually increased from the proximal end near the incident surface to the distal end away from the incident surface.

The setting form of the color of the plurality of positioning members arranged along the first direction may be various, for example, they may be arranged regularly or irregularly. For instance, in the embodiment, the color of the plurality of positioning members is gradually changed from darker to lighter along the X direction in FIG. 1, namely the first direction, that is to say, the reflectivity is gradually increased along the X direction in FIG. 1. The first direction is a direction extended from a first end of the first surface adjacent to the incident surface to a second end opposite to the first end, and the first direction refers to a direction parallel to the direction from the first end to the second end. As shown in FIG. 1, the X direction is unidirectional.

To further solve the bright and dark problem of the periphery of the LGP positioning structure, in another embodiment, for example, protrusions or recessions are disposed on one surface of the positioning member 20 contacting the LGP 3.

Figure 2:
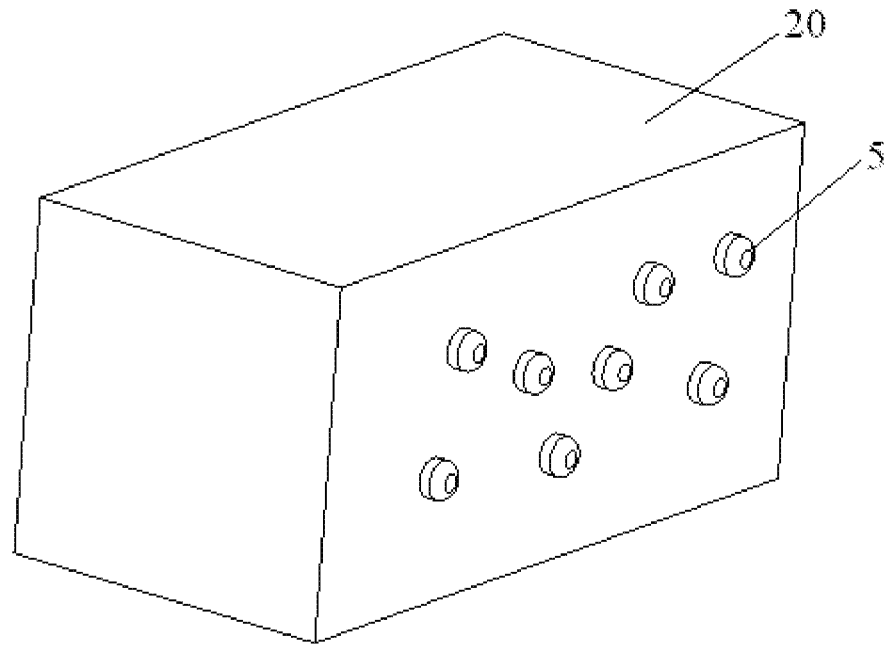
FIG. 2 is a schematic structural view of a positioning member in an embodiment of the present disclosure.

As shown in FIG. 2, for instance, when the protrusions 5 are disposed on one surface of the positioning member 20 contacting the first surface of the LGP 3, the number of the protrusions 5 on the positioning members near the incident surface is less than the number of the protrusions 5 on the positioning members away from the incident surface. By arranging the protrusions 5 on the positioning members contacting a side surface of the LGP, the light scattering effect is enhanced at contact positions. Scattered light is emitted from a light-emitting surface of the LOP, where the brightness of the light-emitting surface of the LGP is increased. The number of the protrusions 5 disposed at distal-end positions away from the incident surface, where shadows can be easily generated, is correspondingly increased to enhance the brightness at the positions, and the bright and dark problem can be further solved.

The position and the number of the plurality of protrusions 5 arranged along the first direction may be various, for example, they may be arranged regularly or irregularly. In the embodiment, the number of the protrusions 5 on the plurality of positioning members is gradually increased along the first direction. The first direction is a direction parallel to the direction from a first end of the first surface adjacent to the incident surface to a second end opposite to the first end.

For instance, when the recessions are formed on one surface of the positioning member contacting the first surface of the LGP 3, the number of the recessions on the positioning members near the incident surface is greater than the number of the recessions on the positioning members away from the incident surface. The recessions on the positioning members do not contact the side surface of the LGP. The light scattering effect is reduced here, and the brightness of light emitted from the light-emitting surface of the LGP is reduced. The number of the recessions at distal-end positions away from the incident surface, where the shadows can be easily generated, is correspondingly decreased to enhance the brightness at the positions, and the bright and dark problem can be further solved.

The position and the number of the plurality of recessions arranged along the first direction may be various, may be regular and may also be irregular. In the embodiment, the number of the recessions on the plurality of positioning members is gradually reduced along the first direction. The first direction is a direction parallel to the direction from a first end of the first surface adjacent to the incident surface to a second end opposite to the first end.

Figure 3:
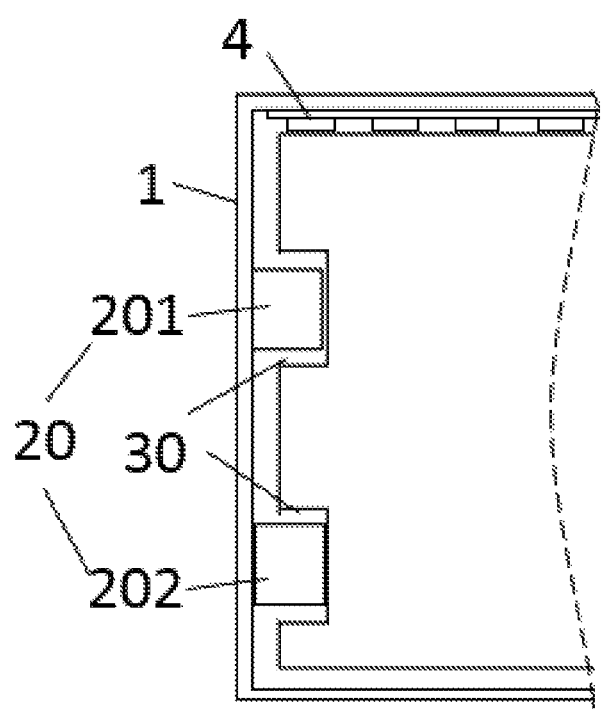
FIG. 3 is a schematic diagram of positioning grooves in the LGP positioning structure in an embodiment of the present disclosure.

For instance, in an embodiment, as shown in FIG. 3, positioning grooves 30 are formed on the first surface of the LGP 3, and the positioning members 20 are received in the positioning grooves 30. The structural form of the positioning grooves 30 is adapted to that of the positioning members 20.

An embodiment of the present disclosure also provides a backlight module, which comprises the LGP positioning structure.

An embodiment of the present disclosure also provides a display device, which comprises the backlight module. The display device may be a liquid crystal display (LCD) device, for instance, and it is not limited to be: a mobile phone, a tablet PC, a TV, a display, a notebook computer, a digital picture frame, a navigator, or the like.

The described above are only exemplary embodiments of the present disclosure, and the present disclosure is not intended to be limited thereto. For one of ordinary skill in the art, various changes and alternations may be made without departing from the technical scope of the present disclosure, and all of these changes and alternations shall fall within the scope of the present disclosure.

What is claimed is:

1. A light guide plate (LGP) positioning structure, comprising:
   a plurality of positioning members arranged between a first surface of a LGP and a back plate, wherein the first surface of the LGP is adjacent to an incident surface of the LGP, and a surface reflectivity of each positioning member at a side of the LGP near the incident surface is lower than a surface reflectivity of any other positioning members at the same side of the LGP far away from the incident surface.

2. The LGP positioning structure according to claim 1, wherein the surface reflectivity of the plurality of positioning members at the same side of the LGP is gradually increased along a first direction, the first direction being a direction extended from a first end of the first surface adjacent to the incident surface to a second end opposite to the first end.

3. The LGP positioning structure according to claim 2, wherein protrusions or recessions are arranged on a surface of the positioning members contacting the first surface of the LGP.

4. The LGP positioning structure according to claim 3, wherein when the protrusions are arranged on the surface of the positioning members contacting the first surface of the LGP, a number of the protrusions on the positioning members near the incident surface is less than a number of the protrusions on the positioning members away from the incident surface.

5. The LGP positioning structure according to claim 4, wherein the number of the protrusions on the plurality of positioning members at the same side of the LGP is gradually increased along a first direction, the first direction being a direction parallel to a direction from a first end of the first surface adjacent to the incident surface to a second end opposite to the first end.

6. The LGP positioning structure according to claim 3, wherein when the recessions are arranged on the surface of the positioning members contacting the first surface of the LGP, a number of the recessions on the positioning members at the same side of the LGP near the incident surface is greater than a number of the recessions on the positioning members at the same side away from the incident surface.

7. The LGP positioning structure according to claim 6, wherein the number of the recessions on the plurality of positioning members at the same side of the LGP is gradually decreased along a first direction, the first direction being a direction parallel to a direction from a first end of the first surface adjacent to the incident surface to a second end opposite to the first end.

8. The LGP positioning structure according to claim 3, wherein positioning grooves are arranged on the first surface, the positioning members are received in the positioning grooves.

9. The LGP positioning structure according to claim 1, wherein the color of the plurality of positioning members at the same side of the LGP is gradually changed from darker to lighter along a first direction, the first direction being a direction extended from a first end of the first surface adjacent to the incident surface to a second end opposite to the first end.

10. The LGP positioning structure according to claim 9, wherein protrusions or recessions are arranged on a surface of the positioning members contacting the first surface of the LGP.

11. The LGP positioning structure according to claim 1, wherein protrusions or recessions are arranged on a surface of the positioning members contacting the first surface of the LGP.

12. The LGP positioning structure according to claim 11, wherein when the protrusions are arranged on the surface of the positioning members contacting the first surface of the LGP, a number of the protrusions on the positioning members near the incident surface is less than a number of the protrusions on the positioning members away from the incident surface.

13. The LGP positioning structure according to claim 12, wherein the number of the protrusions on the plurality of positioning members is gradually increased along a first direction, the first direction being a direction parallel to a direction from a first end of the first surface adjacent to the incident surface to a second end opposite to the first end.

14. The LGP positioning structure according to claim 11, wherein when the recessions are arranged on the surface of the positioning members contacting the first surface of the LGP, a number of the recessions on the positioning members near the incident surface is greater than a number of the recessions on the positioning members away from the incident surface.

15. The LGP positioning structure according to claim 14, wherein the number of the recessions on the plurality of positioning members at the same side of the LGP is gradually decreased along a first direction, the first direction being a direction parallel to a direction from a first end of the first surface adjacent to the incident surface to a second end opposite to the first end.

16. The LGP positioning structure according to claim 1, wherein positioning grooves are arranged on the first surface, the positioning members are received in the positioning grooves.

17. A backlight module, comprising a light guide plate positioning structure, wherein the light guide plate (LGP) positioning structure comprises:
   a plurality of positioning members arranged between a first surface of a LGP and a back plate, wherein the first surface of the LGP is adjacent to an incident surface of the LGP, and a surface reflectivity of each positioning member at a side of the LGP near the incident surface is lower than a surface reflectivity of any other positioning members at the same side of the LGP far away from the incident surface.

18. A display device, comprising a backlight module, wherein the backlight module comprises a light guide plate positioning structure, the light guide plate (LGP) positioning structure comprising:
   a plurality of positioning members arranged between a first surface of a LGP and a back plate, wherein the first surface of the LGP is adjacent to an incident surface of the LGP, and a surface reflectivity of each positioning member at a side of the LGP near the incident surface is lower than a surface reflectivity of any other positioning members at the same side of the LGP far away from the incident surface.

* * * * *

UNITED STATES PATENT AND TRADEMARK OFFICE
CERTIFICATE OF CORRECTION

PATENT NO. : 10,718,893 B2  
APPLICATION NO. : 15/757106  
DATED : July 21, 2020  
INVENTOR(S) : Yongda Ma, Jianbo Xian and Yong Qiao Page 1 of 1

It is certified that error appears in the above-identified patent and that said Letters Patent is hereby corrected as shown below:

On the Title Page

Add item (30):  
(30) Foreign Application Priority Data  
Feb. 9, 2017 (CN) 201720119584.3

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*